(12) United States Patent
Cuenca Rincon et al.

(10) Patent No.: US 10,507,622 B2
(45) Date of Patent: Dec. 17, 2019

(54) SYSTEM AND METHOD FOR CURING POLYMER MATRIX COMPOSITE PARTS IN MANUFACTURING AND REPAIRING PROCESSES

(71) Applicant: AIRBUS OPERATIONS SL, Madrid (ES)

(72) Inventors: Jose Cuenca Rincon, Madrid (ES); Juan Salamero Laorden, Madrid (ES); Ana Teresa Rodriguez-Bellido, Madrid (ES)

(73) Assignee: Airbus Operations S.L., Madrid (ES)

( * ) Notice: Subject to any disclaimer, the term of this patent is extended or adjusted under 35 U.S.C. 154(b) by 22 days.

(21) Appl. No.: 15/726,816

(22) Filed: Oct. 6, 2017

(65) Prior Publication Data
US 2018/0099462 A1 Apr. 12, 2018

(30) Foreign Application Priority Data
Oct. 7, 2016 (EP) .................................... 16192782

(51) Int. Cl.
*B29C 70/44* (2006.01)
*B29C 35/02* (2006.01)
(Continued)

(52) U.S. Cl.
CPC .............. *B29C 70/44* (2013.01); *B29C 35/02* (2013.01); *B29C 43/3642* (2013.01);
(Continued)

(58) Field of Classification Search
CPC . B32B 37/10; B32B 37/1009; B32B 37/1018; B32B 38/1858; B29C 43/3642;
(Continued)

(56) References Cited

U.S. PATENT DOCUMENTS 4,548,859 A * 10/1985 Kline .................... B29C 37/006
427/243
4,562,033 A * 12/1985 Johnson .............. B29C 37/0064
156/286

(Continued)

FOREIGN PATENT DOCUMENTS

| EP | 1 235 672 | 9/2002 | |
| GB | 2531600 A * | 4/2016 | ........... B29C 70/443 |
| WO | WO 2016/063065 | 4/2016 | |

OTHER PUBLICATIONS

Extended European Search Report for EP Appln No. 16192782.7, dated Apr. 19, 2017, 9 pages.
(Continued)

*Primary Examiner* — John L Goff, II
(74) *Attorney, Agent, or Firm* — Nixon & Vanderhye PC (57) ABSTRACT

A system for curing polymer matrix composite parts out of autoclave in manufacturing and repairing processes including: (i) an inner vacuum bag (3) placed over the lay-up to be cured located over a working area (15, 18) with the edges of the inner vacuum bag (3) joined to the working area by first sealing elements (8); (ii) a Perforated bulkhead (4) located over the inner vacuum bag (3), (iii) an Outer vacuum bag (2) over a perforated bulkhead (4) and over the edges of the inner vacuum bag with the edges of the outer vacuum bag (2) joined to the working area (15, 18) by second sealing elements (1), (iv) a vacuum device (5, 7, 6) and (v) a heating source (9, 20).

18 Claims, 8 Drawing Sheets

(51) Int. Cl.
  *B29C 73/10*   (2006.01)
  *B29C 73/32*   (2006.01)
  *B29C 73/34*   (2006.01)
  *B32B 37/00*   (2006.01)
  *B32B 37/10*   (2006.01)
  *B29C 73/30*   (2006.01)
  *B29C 43/36*   (2006.01)
  *B29K 63/00*   (2006.01)
  *B29C 73/12*   (2006.01)
  *B29K 105/06*  (2006.01)

(52) U.S. Cl.
  CPC .............. *B29C 73/10* (2013.01); *B29C 73/30* (2013.01); *B29C 73/32* (2013.01); *B29C 73/34* (2013.01); *B32B 37/0046* (2013.01); *B32B 37/1018* (2013.01); *B29C 73/12* (2013.01); *B29K 2063/00* (2013.01); *B29K 2105/06* (2013.01)

(58) Field of Classification Search
  CPC .......... B29C 43/3644; B29C 66/00145; B29C 66/81455; B29C 70/44; B29C 73/32; B29C 73/34; B29C 35/02
  USPC .................................................. 156/285, 286
  See application file for complete search history.

(56) References Cited

U.S. PATENT DOCUMENTS

| | | | |
|---|---|---|---|
| 4,942,013 A | | 7/1990 | Palmer et al. |
| 5,236,646 A | | 8/1993 | Cochran et al. |
| 5,618,606 A | * | 4/1997 | Sherrick ................ B29C 73/10 156/286 |
| 6,761,783 B2 | | 7/2004 | Keller et al. |
| 2003/0188821 A1 | * | 10/2003 | Keller ..................... B29C 43/12 156/94 |
| 2005/0253309 A1 | | 11/2005 | Hou et al. |
| 2008/0148817 A1 | * | 6/2008 | Miller ................... G01M 3/227 73/40 |

OTHER PUBLICATIONS

Hou et al, "Evaluation of Double-Vacuum-Bag Process for composite Fabrication" (NASA Langley Research Center 2004), 13 pages.

\* cited by examiner

SYSTEM AND METHOD FOR CURING POLYMER MATRIX COMPOSITE PARTS IN MANUFACTURING AND REPAIRING PROCESSES

RELATED APPLICATION

This application claims priority to European Patent application EP 16192782.7, filed Oct. 7, 2016, the entirety of which is incorporated by reference.

FIELD OF THE INVENTION

The present invention refers to a system and method for curing polymer matrix composite parts by improved Double Vacuum Bag Debulking (DVD) technique. The method may be applied in two areas: Repairs, such as production and in-service bonded repairs, and Manufacturing such as structural components of the aircraft such as stringers, ribs, skins, front spars.

BACKGROUND OF THE INVENTION

Volatile management during a curing cycle becomes a critical issue for epoxy matrix-based composites.

The traditional Single Vacuum Bag (SVB) process without additional pressure generated by an autoclave normally fails to yield void-free quality composites for epoxy matrix-based composites because of the volatiles (solvents and reaction by products).

A variation of this SVB system uses two vacuum bags during a one step of the cure cycle. This double vacuum bag debulking (DVD) process for volatile and trapped air management in composite materials performs better than the traditional Single Vacuum Bag (SVB) process.

The definition of the double vacuum bag is a vacuum bag process using atmospheric pressure alone that eliminates the need for external pressure supplied normally by an autoclave for composite fabrication.

Figure 1:
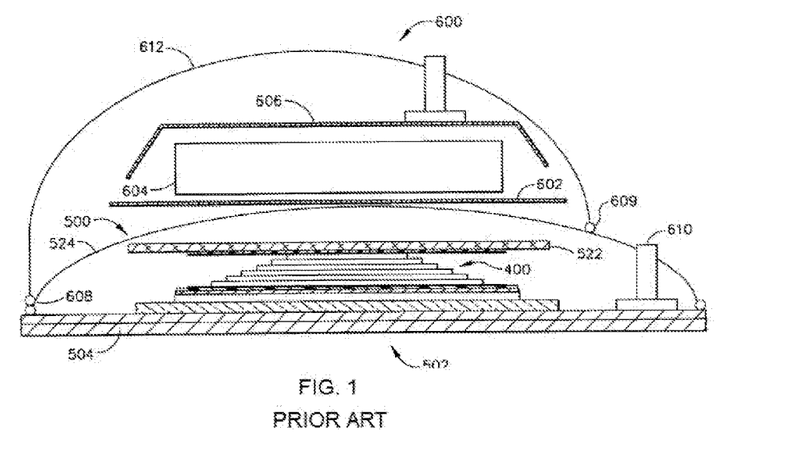
FIG. 1 shows a schematic view of a system according to a first prior art system and corresponds to FIG. 6 of U.S. Pat. No. 6,761,783.

Double Vacuum Bag Debulking processes are known techniques already described in different documents such as U.S. Pat. No. 6,761,783, which describes a method for repairing composite aircraft structures. FIG. 1 of this application corresponds to FIG. 6 of U.S. Pat. No. 6,761,783. As shown in FIG. 1, a method to repair bismaleimide (BMI) composite structures which includes the steps of consolidating the repair patch by vacuum bagging the repair patch and additional layers with a lower vacuum bag and placing a fiberglass cloth over the lower vacuum bagging, a rigid box over the fiberglass cloth and an additional fiberglass over the rigid box and vacuum bagging with an upper vacuum bag joined to the lower vacuum bagging with sealant. In the first step a first vacuum is applied to the lower vacuum bag and then a second vacuum is applied to the upper bag so that the second vacuum is at a level ranging between approximately zero inches to one inches of mercury less than the first vacuum such that the upper vacuum level is equal to or slightly less than the lower vacuum level (tolerance is +0, −1 inches of mercury). See U.S. Pat. No. 6,761,783, col. 11, lns. 6 to 9. In this case, the outer bag is collapsed onto the stiff perforated tool with a pressure (less than one atmospheric pressure). Because of the vacuum differential between the two bags, the inner bag is collapsed, instead of "ballooned", and presses against the composite with a small compaction pressure, which might hinder to some degree an efficient and complete removal of trapped air and volatiles. "If the vacuum in the upper chamber were greater than the vacuum in the lower vacuum bag, the vacuum in the upper chamber would effectively suck the lower vacuum bag and materials up into the upper chamber, damaging or destroying the repair material." U.S. Pat. No. 6,761,783, col. 11, lns. 9 to 13. To prevent this issue the upper vacuum bag should be sealed 100% beyond the sealing points of the inner vacuum bag, with the rigid box between the two sealing points, so that the higher vacuum pressure in the outer bag presses the sealing points of the inner bag and keeps them properly in place avoiding their detachment by the higher pressure in the outer vacuum bag. In the system depicted in this document, this is not possible because of the location of the vacuum source in the inner vacuum bag (item 610 in FIG. 1).

Figure 2:
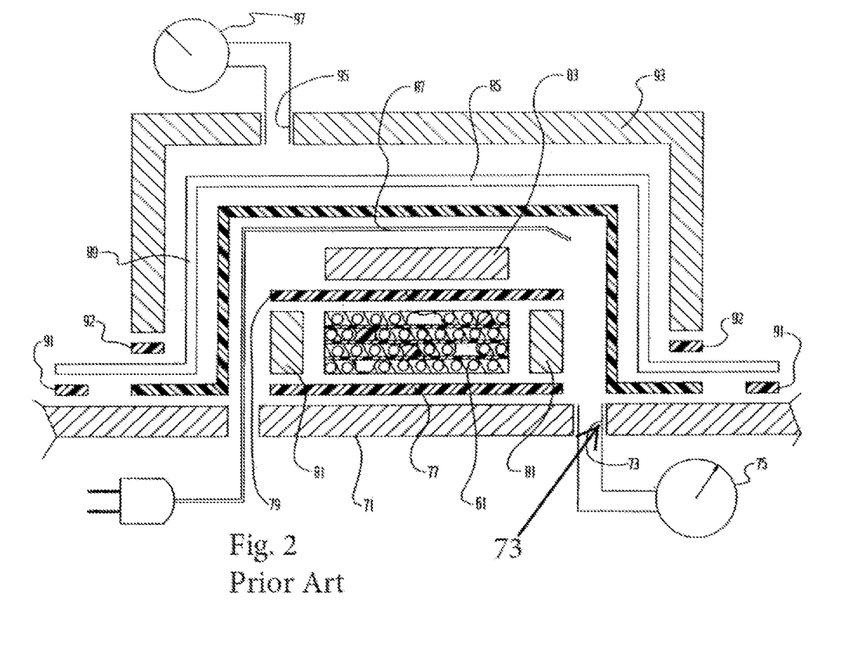
FIG. 2 shows a schematic view of a system according to a second prior art system and corresponds to FIG. 3 of U.S. Pat. No. 5,236,646.

U.S. Pat. No. 5,236,646 relates to a manufacturing process of substantially void-free consolidated thermoplastic composite, by two independent low-pressure vacuum chambers comprising a vacuum bag that creates an inner chamber that totally covers the layers or plies of thermoplastic material and an "outer-rigid vacuum chamber, consisting of steel etc., open-ended box, is set over the entire lay-up so that the underside edges of the box, having additional sections of sealing tape secured thereto, fit securely and firmly onto the upper surface of the flexible bag thereby ensuring that a hermetically sealed second vacuum chamber is formed between the outer surface of the flexible bag, i.e. inner chamber, and the rigid chamber and allowing the peripheral area of bag to extend therebeyond. An aperture connects into the outer chamber thereby formed to allow connection of a second vacuum, as shown by gauge. "U.S. Pat. No. 5,236,646, col. 5, ln. 65 to col. 6, ln. 8 (reference numbers removed from quotation). The process consists on simultaneously applying a vacuum in the first chamber and a second vacuum under the rigid vacuum chamber. During the initial step, the vacuum in the said outer chamber may range from about 0 to 2 inches of Hg, more or less, i.e. plus or minus, than the vacuum in said inner chamber until substantially all the volatiles are removed. U.S. Pat. No. 5,236,646, col. 7, lns. 9-16. When the vacuum in the outer chamber is 2 inches of Hg less than in the inner vacuum bag, this will collapse and as discussed above the volatile extraction will be hindered to a certain degree. When the vacuum in the outer chamber is 2 inches of Hg more than in the inner vacuum bag, this will balloon and will remain stable in place if the underside edges of the rigid chamber are sealed and firmly secured onto the outer surface of the inner bag. In the manufacture of three dimensional components (sandwich panels with chamfered areas, omega or T stringers, etc.) the proper and complete sealing of the outer rigid vacuum chamber could be hardly achieved if the inner vacuum bag has been folded in the relevant zones to accommodate and adapt to the component shape. Additionally, this system cannot be applied for repairing processes because the vacuum source in the inner vacuum bag is located in the manufacturing tool inside the area covered by the outer rigid chamber (item 73 in FIG. 2 which is taken from FIG. 3 of U.S. Pat. No. 5,236,646).

Figure 3:
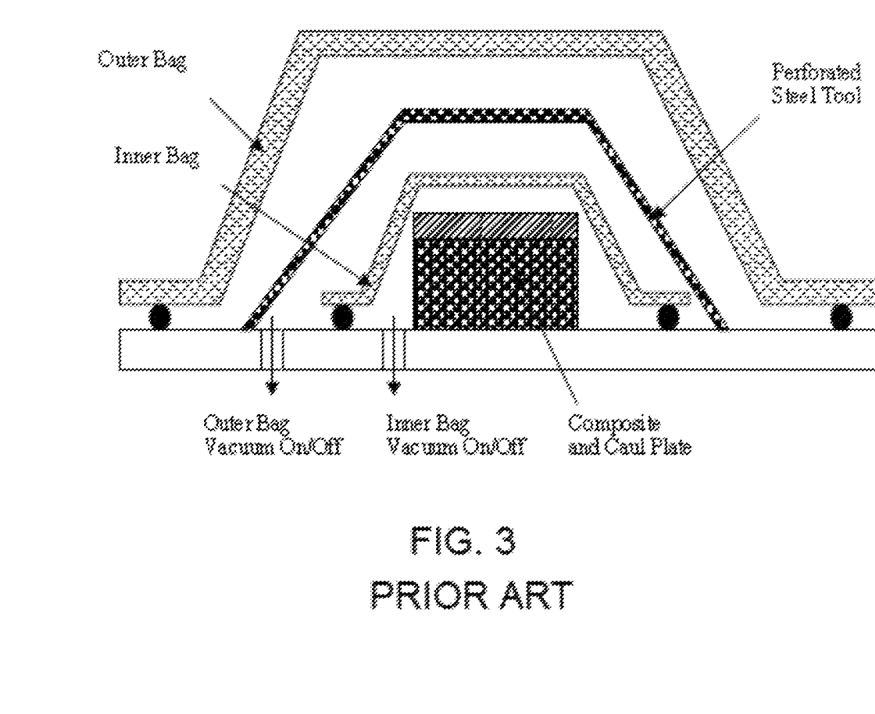
FIG. 3 shows a schematic view of a system according to a third prior art system FIG. 3 corresponds to Hou et al, "Evaluation of Double-Vacuum-Bag Process for composite Fabrication" (NASA Langley Research Center 2004).

In addition to these documents reviewed above, publication Hou et al, "Evaluation of Double-Vacuum-Bag Process for composite Fabrication" (NASA Langley Research Center, Hampton, Va. 23681) describes another composite manufacturing process of void-free high quality laminate based on double vacuum bagging technique (FIG. 3 of this application corresponds to FIG. 3 of the Hou NASA publication 2004).

The Hou NASA publication described a fiber reinforced reactive resin matrix prepregs that are laid up between the caul and the tool steel plates. They are then enclosed by a vacuum bag (designated as Inner Bag), which is sealed around the edges onto the tool plate. A vacuum port is built on the tool plate inside the Inner Bag and connected to a vacuum pump as with the SVB process. A second vacuum bag (designated as Outer Bag) is then assembled in the same fashion, with a vacuum port built on the tool plate, which is located between the inner and outer bags and connected to a separate vacuum pump. Before assembling the outer bag, a perforated tool is first installed outside the perimeter of the Inner Bag. This tool has to be stiff enough to withstand the 14.7 Psi atmospheric pressure created by the vacuum.

During the B-stage (i.e., the low temperature ramp-and-hold period), full vacuum (30" Hg) is applied to the Outer Bag, while a slightly lower vacuum level (i.e., 28" Hg) is set in the Inner Bag. The Outer Bag is collapsed onto the stiff perforated tool due to the atmospheric pressure outside the bags. Because of the vacuum differential between the two bags, the Inner Bag is "ballooned" and presses against the perforated stiff tool leaving no compaction force, while still producing vacuum, on the composite. In the DVB arrangement, the composite lay-up assembly is not compacted by the atmospheric pressure via the Inner Bag, and remains loose. Volatiles are free to escape by the vacuum suction from the Inner Bag vacuum pump during the B-stage.

"At the end of the B-stage, the Outer Bag is purged to atmosphere, while the Inner Bag vacuum is increased to 30" Hg. The Outer Bag becomes loose from the tool, and the Inner Bag collapses onto the caul plate with one atmospheric pressure. This pressure helps to consolidate the laminate during the high temperature ramp-and-hold period of the cure cycle." Hou NASA publication, page 6.

The Hou NASA publication also discusses the possibility of using the system in the opposite way, by applying a lower vacuum pressure to the outer chamber than to the inner bag, so that the inner bag is collapsed and presses against the composite with a small compaction pressure. It is argued that the volatile depletion will not be hindered by the slightly compacted fibrous architecture and it is mentioned that the potential for inner bag leakage is greatly reduced. This risk had been already described in U.S. Pat. No. 6,761,783 where this way of working (lower pressure in the outer bag than in the inner bag) was also chosen. Even if this system has a different arrangement for the sealing lines and the vacuum sources, this system also presents the same issue described above for the system of document U.S. Pat. No. 6,761,783, that is: the inner vacuum bag when it is "ballooned" might drag the seal tape and break the sealing lines. The extent to which the air trapped between plies during the lay-up and the volatiles are effectively removed with a small compaction pressure acting on the inner bag will depend on the type and on the thickness of the fiber reinforcement. The thicker and the tighter the reinforcement, the more difficult the trapped air and volatiles removal against the compaction pressure will be.

This system is not applicable to repairs because of the positions of the vacuum sources in the tool.

SUMMARY OF THE INVENTION

The present invention overcomes some or all the above-mentioned problems related to the reduction of volatiles and trapped air management by improving the DVD technique by a system for curing polymer matrix composite parts out of autoclave in manufacturing and repairing processes which comprises:

(i) An inner vacuum bag placed over the lay-up to be cured, which is located on a working area, with the edges of the inner vacuum bag joined to the working area by first sealing means wherein the working area can be either a repairing area or a manufacturing area, (ii) A perforated bulkhead placed over the inner vacuum bag, (iii) An outer vacuum bag placed over the perforated bulkhead and over the edges of the inner vacuum bag with the edges of the outer vacuum bag joined to the working area by second sealing means, (iv) A vacuum device, such as an air extraction pump, located on the working area so that the outer vacuum bag presses both the edges of the inner vacuum bag and inner sealant tape in a first step of the curing process wherein vacuum pressure is applied both to the inner vacuum bag and the outer vacuum bag and (v) A heating source located either outside the outer vacuum bag or below the inner vacuum bag.

In one embodiment the outer vacuum bag comprises a vacuum connector, as a vacuum mean, attached to the inner vacuum bag configured such that regulates pressure in the inner vacuum bag. A second vacuum connector is installed in the outer vacuum bag to provide vacuum pressure to the outer vacuum bag.

In another embodiment vacuum in the inner vacuum bag is applied by a tubular element, as a vacuum mean, located below the outer and inner vacuum bags and the first and second sealing elements and attached to the outer and inner bags by third and fourth sealing elements.

The method for manufacturing polymer matrix composite parts and the method for repairing polymer matrix composite parts comprise, in both cases, the step of curing the composite part or the composite patch by the system described below.

The process for curing the polymer matrix composite part, either for repairing processes or for manufacturing processes, comprises the following steps:

(i) Applying vacuum pressure both to the inner vacuum bag and to the outer vacuum bag of a system described above being the vacuum pressure applied in the outer bag between 6 to 10 mbar (millibar) higher than in the inner bag, preferably about 6 mbar higher than in the inner bag, so that the trapped air and the volatiles are extracted and the inner bag is "ballooned" against the perforated bulkhead while the outer bag presses the edges of the inner vacuum bag and the first sealant tape, avoiding its detachment from the working area.

(ii) Heating the working area through a heating source with heating temperature and heating time dictated for the rheology of the polymer matrix being cured. Several arrangements can be used to provide heat in a controlled manner (defined heating rate, time and temperature) to the system.

In manufacturing processes: (i) the working area may be the heating element or, (ii) an independent heating element may be placed on the working area below the polymer matrix composite or (iii) the system comprising the Double Vacuum Bag embodiment, used to debulk and compact the polymer matrix composite lay-up, is placed in a heating chamber.

In repairing processes: (i) the heating element is placed on top of the polymer matrix composite repair patch to be cured or (ii) if feasible, the part to be repaired and the system comprising the Double Vacuum Bag embodiment, used to debulk and compact the polymer matrix composite repair patch, are placed in a heating chamber.

Finally, releasing the vacuum in the outer bag while applying vacuum to the inner vacuum bag to produce compaction of the lay-up and completing the cure cycle according to the material.

This invention may be embodied to overcome the above-identified problems described because:

(i) the invention may be designed to work with slightly higher vacuum pressure in the outer bag than in the inner bag, so that this is ballooned and the removal of trapped-air and volatiles is not hindered to any extent by any compaction pressure.

(ii) the invention may be designed so that the sealing lines of the inner vacuum bag are not exposed to the differential pressure between the two bags but firmly pressed by the vacuum pressure in the outer bag and, therefore, when the inner bag is "ballooned", its sealing lines will not detach from the working area, and (iii) the invention may be designed to be applied in repairing processes because the vacuum sources are not installed through the working area but externally through the vacuum bags.

BRIEF DESCRIPTION OF THE DRAWINGS

Embodiments of the invention are henceforth described with reference to the accompanying drawings, in which.

DETAILED DESCRIPTION OF EMBODIMENT(S) OF THE INVENTION

Figure 4:
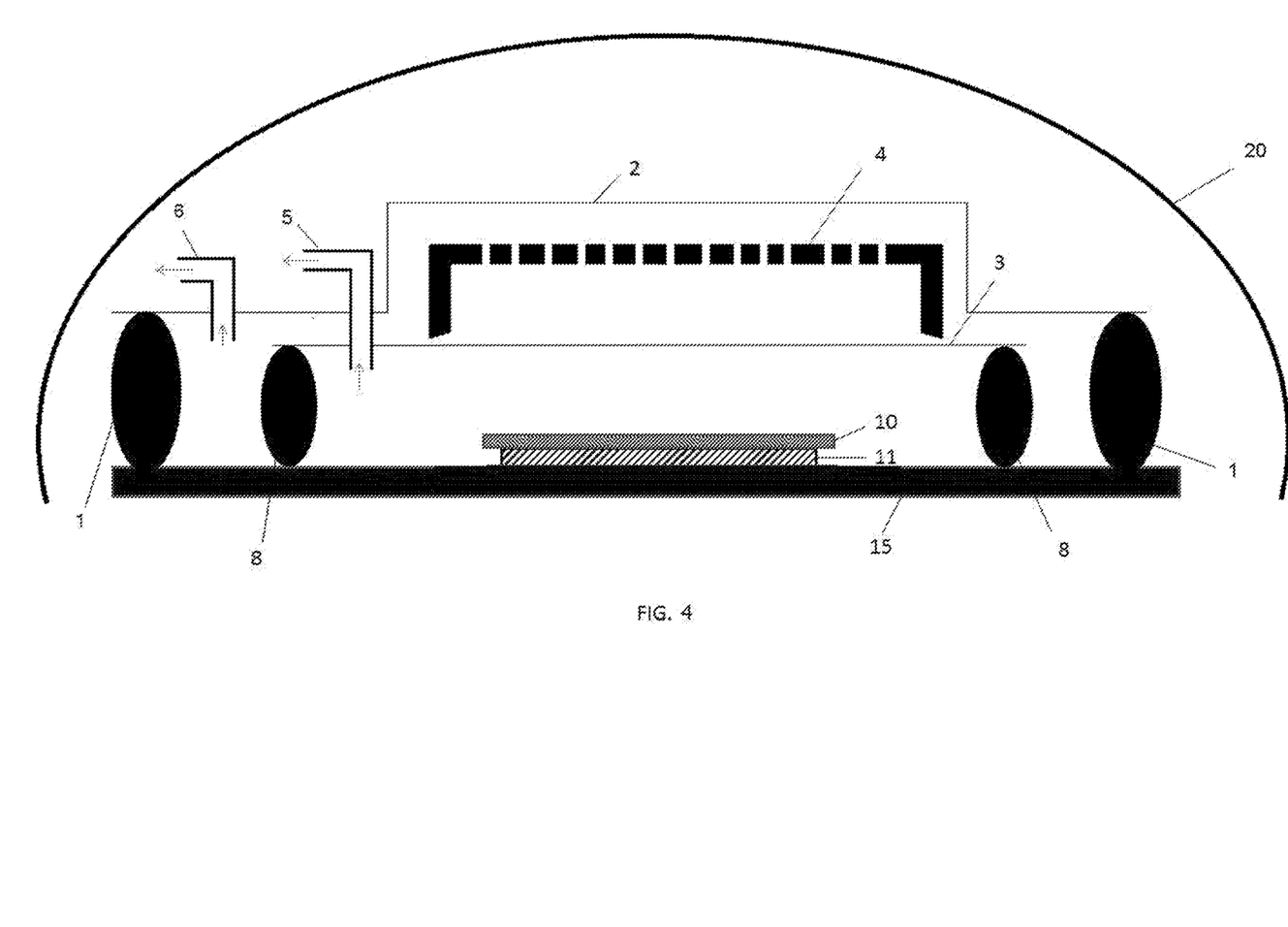
FIG. 4 shows a schematic view of a system according to first embodiment for manufacturing polymer matrix composite parts.
Figure 5:
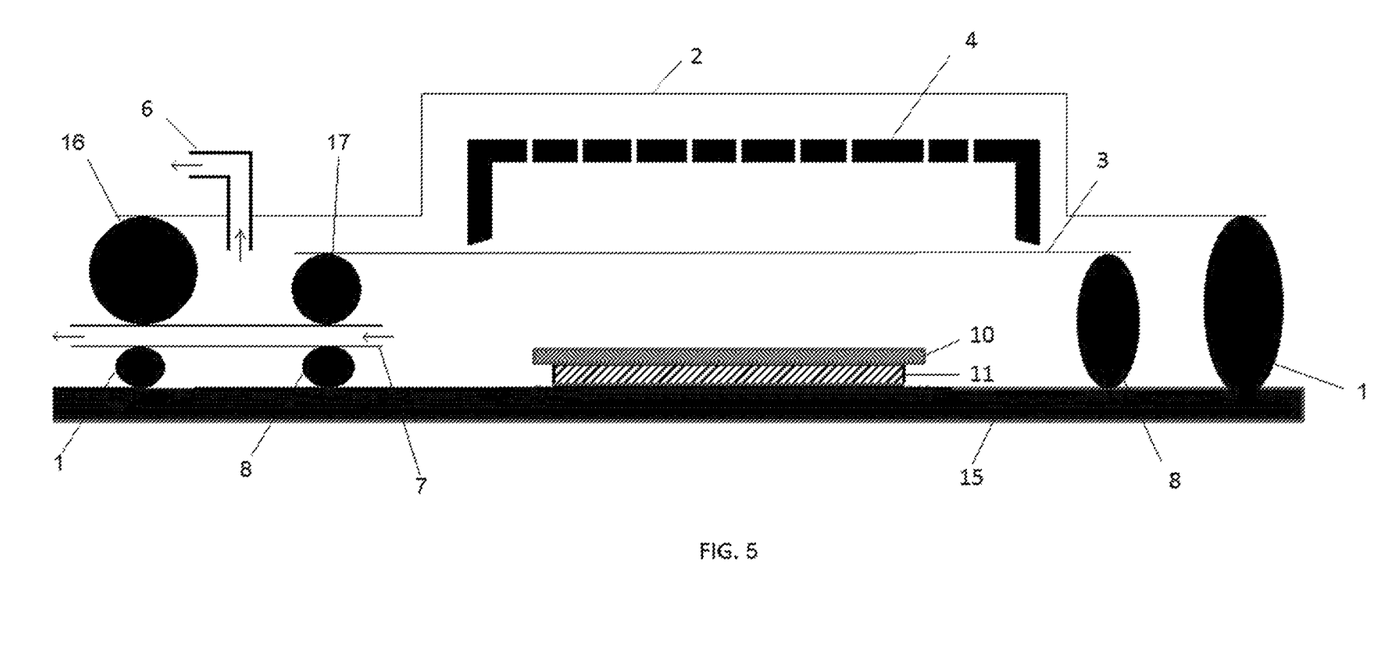
FIG. 5 shows a schematic view of a system according to second embodiment for manufacturing polymer matrix composite parts.

As shown in FIGS. 4 and 5 the system for manufacturing polymer matrix composites comprises an inner vacuum bag (3) joined by its edges to the manufacturing area (15) by first sealing elements (8), placed over the lay-up to be cured (11) located on a manufacturing area (15), a perforated bulkhead (4) located over the inner vacuum bag (3), an outer vacuum bag (2) over the perforated bulkhead (4) and over the edges of the inner vacuum bag (3) with its edges joined to the manufacturing area by second sealing elements (1).

The system therefore comprises, as shown in FIGS. 4 and 5, vacuum device to press the edges of the inner vacuum bag (3) and the first sealant tape (8) in a first step of the curing process wherein vacuum pressure is applied both to the inner vacuum bag (3) and to the outer vacuum bag (2) with a slightly higher pressure in the outer vacuum bag than the vacuum pressure in the inner vacuum bag.

In a first embodiment, shown in FIG. 4, the vacuum device are two vacuum connectors (5, 6):

(i) a first vacuum connector (5) connected to the inner vacuum bag and attached to the inner (3) and outer (2) vacuum bag configured such that it regulates pressure in the inner vacuum bag (3) and (ii) a second vacuum connector (6) attached to the outer vacuum bag (2) configured such that regulates pressure in the outer vacuum bag (2).

In a second embodiment, shown in FIG. 5, the first vacuum connector is a tubular element (7) located under the outer (2) and inner vacuum bag (3) and over the first (8) and second sealing (1) elements and attached to the outer (2) and inner (3) vacuum bag by third (17) and fourth (16) sealing elements.

The system is not only applicable for manufacturing process but also to repairing processes since it can be installed over the part to be repaired and vacuum can be applied in both vacuum bags, inner and outer.

Figure 6:
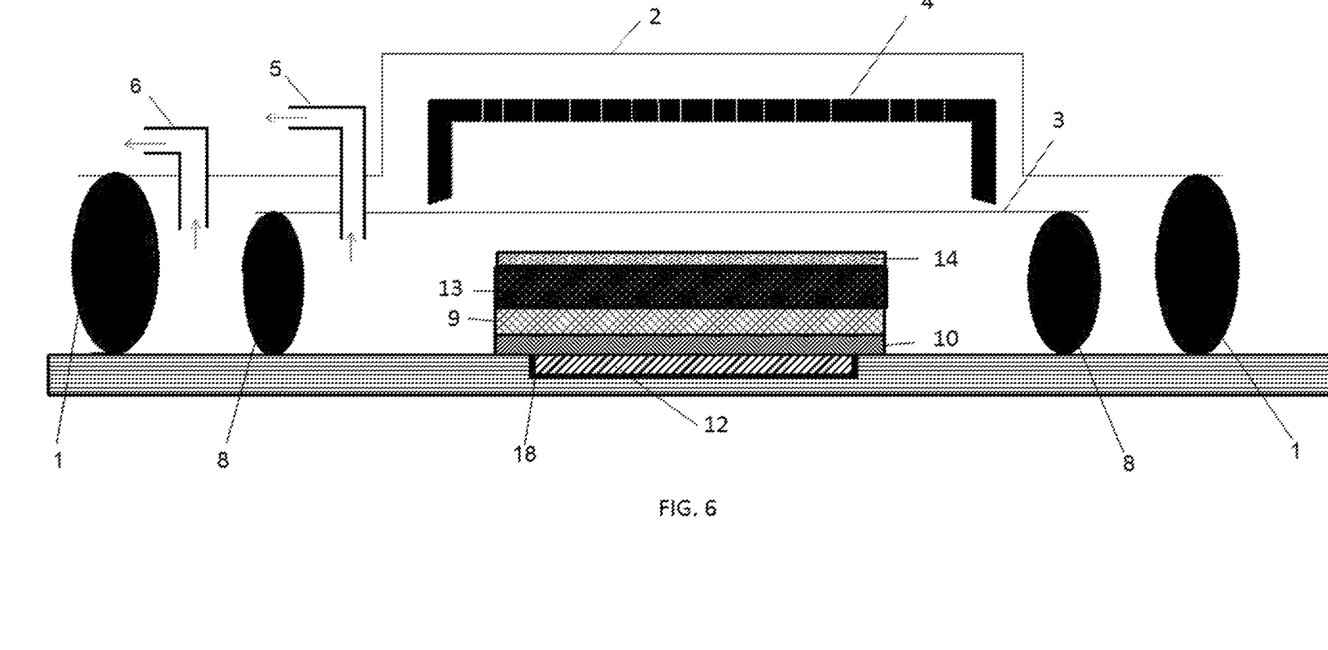
FIG. 6 shows a schematic view of a system according to third embodiment for repairing polymer matrix composite parts.
Figure 7:
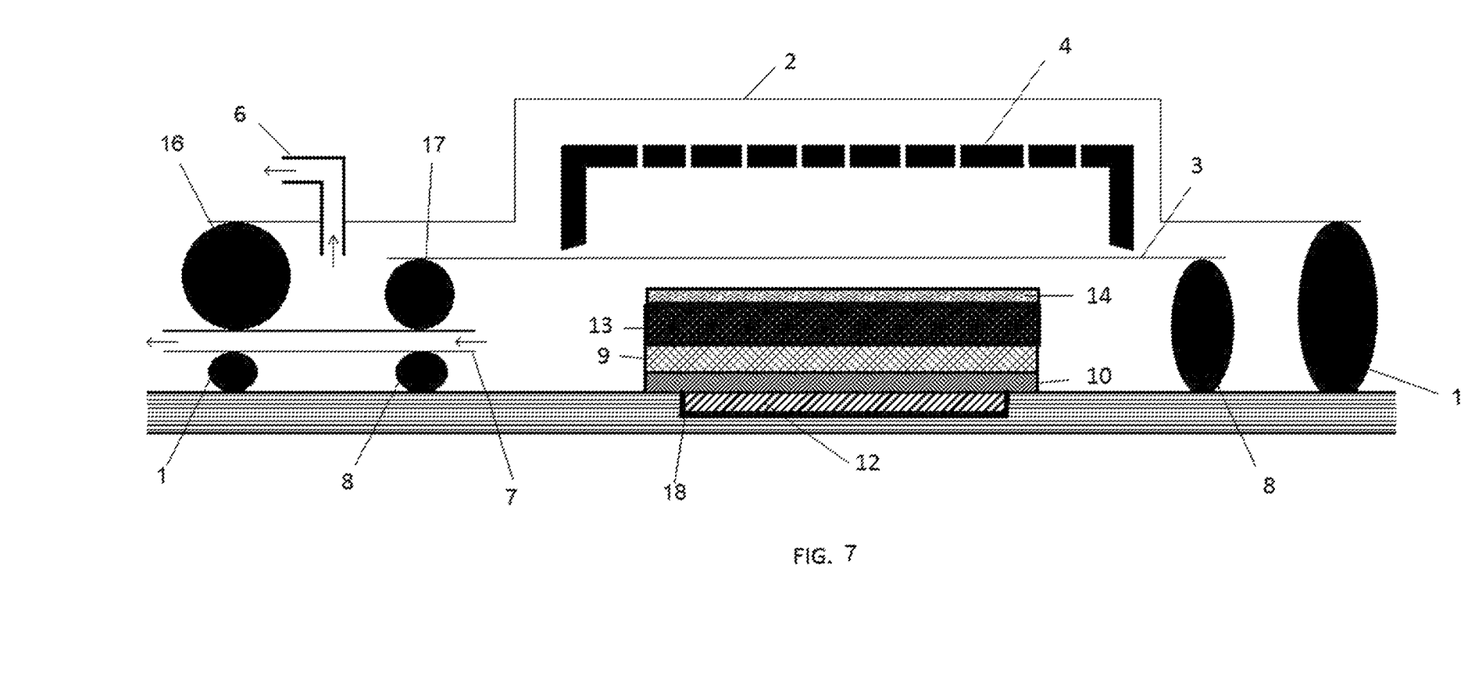
FIG. 7 shows a schematic view of a system according to fourth embodiment for repairing polymer matrix composite parts.

As shown in FIGS. 6 and 7, third and fourth embodiments, the same system used for manufacturing is used for repairing, comprising as vacuum device two vacuum ports, with the first vacuum port (5, 7) connected to the inner vacuum bag (3) and the second vacuum port (6) connected to the outer vacuum bag (2).

As shown in FIG. 7, in the fourth embodiment for repairing, in a similar manner to the second embodiment for manufacturing (FIG. 5), the first vacuum port is a tubular element (7) located under the outer (2) and inner vacuum bag (3) and over the first (8) and second sealing (1) elements and attached to the outer and inner vacuum bag by the third (17) and fourth (16) sealing elements.

Figure 8:
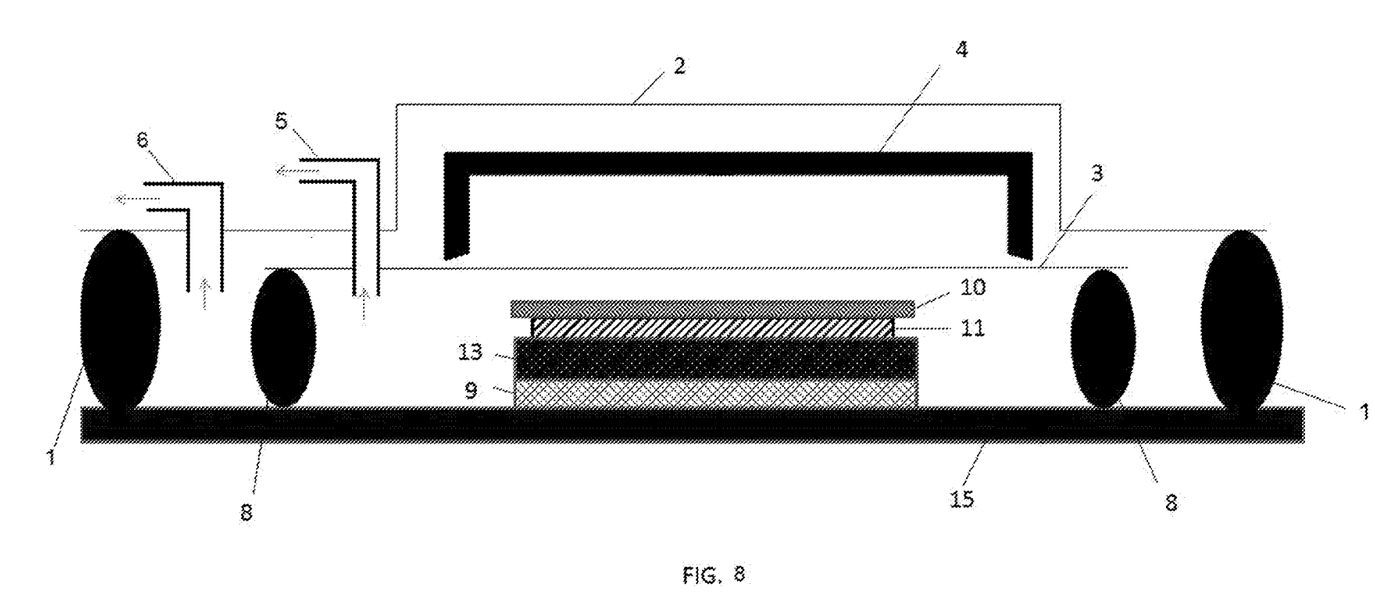
FIG. 8 shows a schematic view of a system according to fifth embodiment for manufacturing polymer matrix composite part.

In the method for manufacturing a polymer matrix composite part by the system described above, the polymer matrix composite lay-up (11) is placed over the working area (15), which is a metal plate, and ancillary materials (10) are placed over the lay-up (11), as shown in FIGS. 4 and 5. The heating source can be, as shown in FIG. 8, a heating element (9) placed below the inner vacuum bag (3) and between the polymer matrix composite lay-up (11) and the working area (15). Over the heating element (9) a metal plate (13) may be disposed. As another alternative, the heating element can be an oven (20) as shown in FIG. 4, located outside the outer vacuum bag (2) or the heating source can be the working area as shown in FIG. 5.

Figure 9:
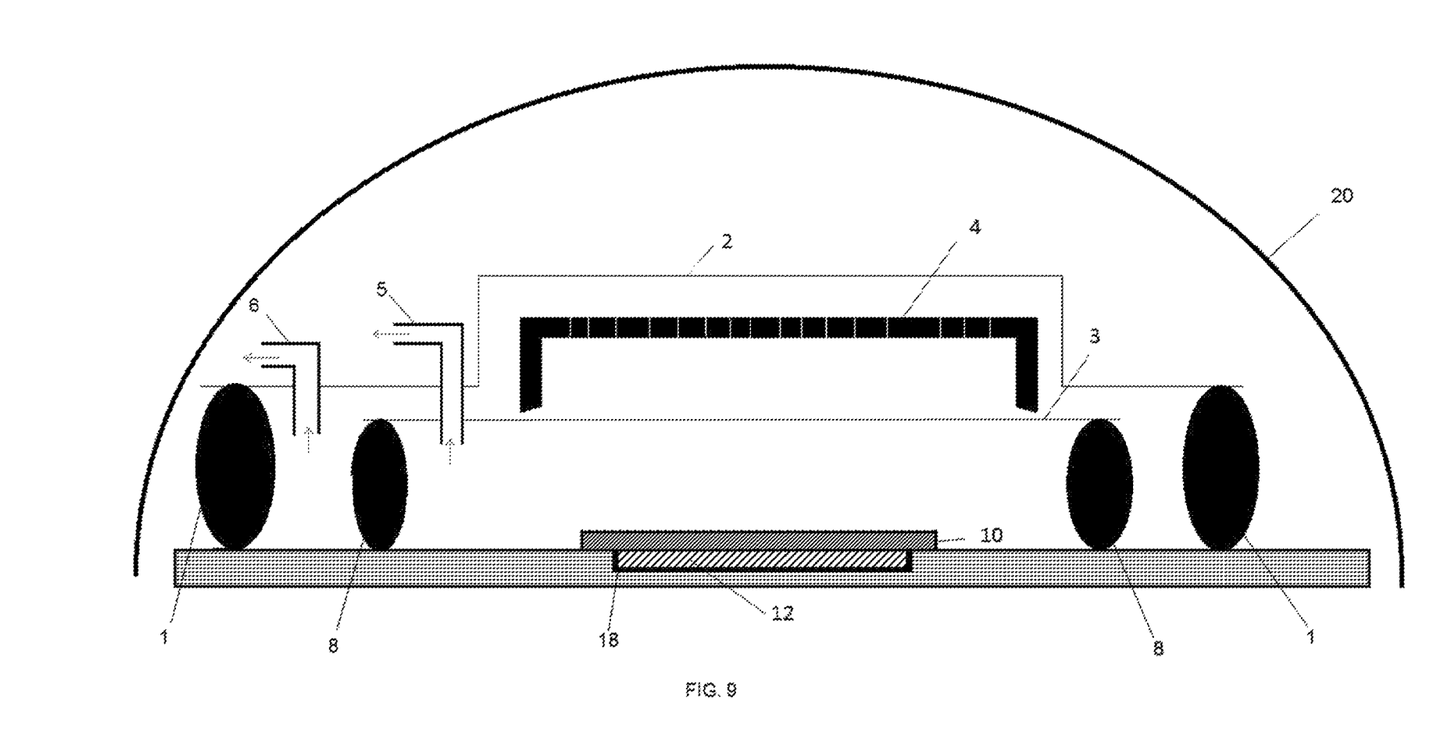
FIG. 9 shows a schematic view of a system according to sixth embodiment for repairing polymer matrix composite parts.

In the method for repairing a polymer matrix composite part by the system described above, a patch (12) of a polymer matrix composite lay-up is placed on the repairing area (18) and a first ancillary material (10) is placed over the patch (12), as shown in FIGS. 6, 7 and 9.

As mentioned before, there are different options for the heating source. In FIGS. 6 and 7 it is shown that the heating source is a heating element (9) placed under the inner vacuum bag (3) and over the patch (12) and the first ancillary material (10). Additionally a second ancillary material (14) is located below the inner vacuum bag (3) and over the heating element (9). Between the heating element (9) and the second ancillary material (14) a metal plate (13) may be disposed As another alternative, the heating source can be an oven (20) as shown in FIG. 9, located outside the outer vacuum bag (2).

Ancillary material will be understood as bleeders, breathers, release films, perimeter glass fiber, peel plies, airwavers or whatever accessories or materials which serve to extract volatiles out of the system and allows the correct performance of the curing and demoulding While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for curing a polymer matrix composite lay-up which comprises:
    an inner vacuum bag placed over the lay-up to be cured located over a working area with edges of the inner vacuum bag joined to the working area by at least one first sealing element, wherein the working area is at least one of a repairing area and a manufacturing area;
    a perforated bulkhead located over the inner vacuum bag, wherein the bulkhead includes a cover over the working area and sides extending down from the cover towards the working area, wherein the sides are offset from a horizontal plane that includes at least a portion of the cover, and the sides include a lowermost edge seated on the inner vacuum bag inward of the edges of the inner vacuum bag;
    an outer vacuum bag placed over the perforated bulkhead and over the edges of the inner vacuum bag, wherein edges of the outer vacuum bag are joined to the working area by at least one second sealing element and wherein the edges of the inner vacuum bag are sandwiched between the outer vacuum bag and the at least one first sealing element;
    a vacuum device located over the working area so that the outer vacuum bag presses both the edges of the inner vacuum bag and the first sealant element in a first step of a curing process, wherein a vacuum pressure is applied both to the inner vacuum bag and to the outer vacuum bag, and
    a heating source located outside the outer vacuum bag or below the inner vacuum bag.

2. The system according to claim 1 wherein the working area is a repairing area of a polymer matrix composite part which comprises a patch of a polymer matrix composite lay-up and a first ancillary material is placed over the patch.

3. The system according to claim 2 wherein the heating source includes a heating element placed under the inner vacuum bag and over the patch and the first ancillary material.

4. The system according to claim 2 wherein the heating source is an oven located outside the outer vacuum bag.

5. The system according to claim 1 wherein the working area is a metal plate manufacturing area.

6. The system according to claim 5 wherein the polymer matrix composite lay-up is placed over the working area and ancillary materials are placed over the lay-up.

7. The system according to claim 6 wherein the heating source is a heating element placed below the inner vacuum bag and between the polymer matrix composite lay-up and the working area.

8. The system according to claim 7 wherein over the heating element a metal plate is disposed.

9. The system according to claim 6 wherein the heating source is the working area.

10. The system according to claim 6 wherein the heating source is an oven, located outside the outer vacuum bag.

11. The system according to claim 1, wherein the vacuum device includes:
    a first vacuum port connected to the inner vacuum bag and the first vacuum port is configured to regulate pressure in the inner vacuum bag, and
    a second vacuum port attached to the outer vacuum bag and the second vacuum port is configured to regulate pressure in the outer vacuum bag.

12. The system according to claim 11 wherein the first vacuum port includes a tubular element located under the outer and inner vacuum bags, and over the first and second sealing elements, and the tubular element is attached to the outer and inner vacuum bag by third and fourth sealing elements.

13. A method for curing a polymer matrix composite lay-up comprising:
    positioning an inner vacuum bag on a working area, wherein a first seal is between an outer edge region of the inner vacuum bag and the working area;
    positioning a lowermost edge of sides of a perforated bulkhead on the inner vacuum bag such that the lower edge is inward on the inner vacuum bag of the outer edge region, wherein the perforated bulkhead includes a cover over the working area and the sides extending down from the cover towards the working area and the sides are offset from a horizontal plane that includes at least a portion of the cover;
    positioning an outer vacuum bag over the perforated bulkhead and the inner vacuum bag such that the outer edge region of the inner vacuum bag is sandwiched between the outer vacuum bag and the first seal;
    applying vacuum pressure both to the inner vacuum bag and to the outer vacuum bag, wherein the vacuum pressure applied in the outer vacuum bag is in a range of 6-10 mbar higher than pressure in the inner vacuum bag, to evacuate gases and balloon the inner vacuum bag against the perforated bulkhead while the outer vacuum bag presses edges of the inner vacuum bag against the working area;
    heating the working area through a heating source located either outside the outer vacuum bag or below the inner vacuum bag, and
    releasing a vacuum in the outer vacuum bag while applying a vacuum to the inner vacuum bag to assist in compaction of a lay-up during a cure cycle.

14. A system for curing a polymer matrix composite lay-up which comprises:
    a working area configured to receive the polymer matrix composite lay-up;
    an inner vacuum bag having edges;
    a first sealing element sandwiched between the edges of the inner vacuum bag and the working area, wherein the first sealing element, the inner vacuum bag and the working area form a first sealed volume between the inner vacuum bag and the working area and which includes the polymer matrix composite layup;

a perforated bulkhead positioned over the inner vacuum bag and over the polymer matrix composite lay-up, wherein the perforated bulkhead includes a cover over the working area and sides extending down from the cover towards the working area, wherein the sides are offset from a horizontal plane that includes at least a portion of the cover, and the sides include a lowermost edge seated on the inner vacuum bag inward of the edges of the inner vacuum bag;

an outer vacuum bag placed over the perforated bulkhead, wherein the outer vacuum bag has edges, wherein the edges of the inner vacuum bag are sandwiched between the outer vacuum bag and the first sealing element;

a second sealing element sandwiched between the edges of the outer vacuum bag and the working area, wherein the second sealing element, the outer vacuum bag and the working area form a second sealed volume between the outer vacuum bag and the inner vacuum bag with the perforated bulkhead within the second sealed volume;

a first vacuum source coupled to extract gasses from the first sealed volume;

a second vacuum source coupled to extract gasses from the second sealed volume, wherein the second vacuum source is configured to create a greater vacuum in the second sealed volume than the vacuum created in the first sealed volume by the first vacuum source, and a heating source configured to heat the polymer matrix composite lay-up located outside the outer vacuum bag or below the inner vacuum bag.

15. A method comprising:

positioning a polymer matrix composite lay-up on an upper surface of a working area;

applying an inner vacuum bag over the polymer matrix composite lay-up;

sealing a region of the inner vacuum bag to the working area by placing a first sealing element between an outer edge region of the inner vacuum bag and the working area, wherein the region circumscribes the polymer matrix composite lay-up and the sealing forms a first sealed volume between the inner vacuum bag, the first sealing element and the working area which includes the polymer matrix composite lay-up;

positioning a perforated bulkhead over the inner vacuum bag and over the polymer matrix composite lay-up such that a lowermost edge of side walls of the perforated bulkhead seats on the inner vacuum bag inward of the outer edge region of the inner vacuum bag, wherein the sidewalls extend downward from a cover which is over the working area and the sidewalls are offset from a horizontal plane that includes at least a portion of the cover;

applying an outer vacuum bag over the perforated bulkhead, the inner vacuum bag and the polymer matrix composite lay-up, wherein the outer edge region of the inner vacuum bag is sandwiched between the outer vacuum bag and the first sealing element;

sealing a region of the outer vacuum bag to the working area, wherein the region circumscribes the perforated bulkhead and the polymer matrix composite lay-up and the sealing forms a second sealed volume between the outer and inner vacuum bags which includes the perforated bulkhead;

applying a vacuum to both the first and second sealed volumes, wherein the vacuum reduces pressure in the second sealed volume to a greater extent than the reduction of pressure in the first sealed volume;

heating the working area and the polymer matrix composite lay-up through a heating source located either outside the outer vacuum bag or below the inner vacuum bag, and increasing pressure in the second sealed volume to a pressure greater than the pressure in the first sealed volume to cause the inner vacuum bag to compact the polymer matrix composite lay-up.

16. The method of claim 15 wherein the first and second sealed volumes have a pressure difference in a range of 6 to 10 millibar during the application of the vacuum step.

17. The method of claim 15 wherein the application of the vacuum step causes the inner vacuum bag to press against an inner surface of the perforated bulkhead and causes the outer vacuum to press against an outer surface of the perforated bulkhead.

18. The method of claim 15 wherein the step of sealing a region of the inner vacuum bag to the working area includes positioning a first sealing element between the region of the inner vacuum bag and the working area, and the step of sealing the region of the outer vacuum bag to the working area includes positioning a second sealing element between the region of the outer vacuum bag and the working area.

* * * * *